UNITED STATES PATENT OFFICE.

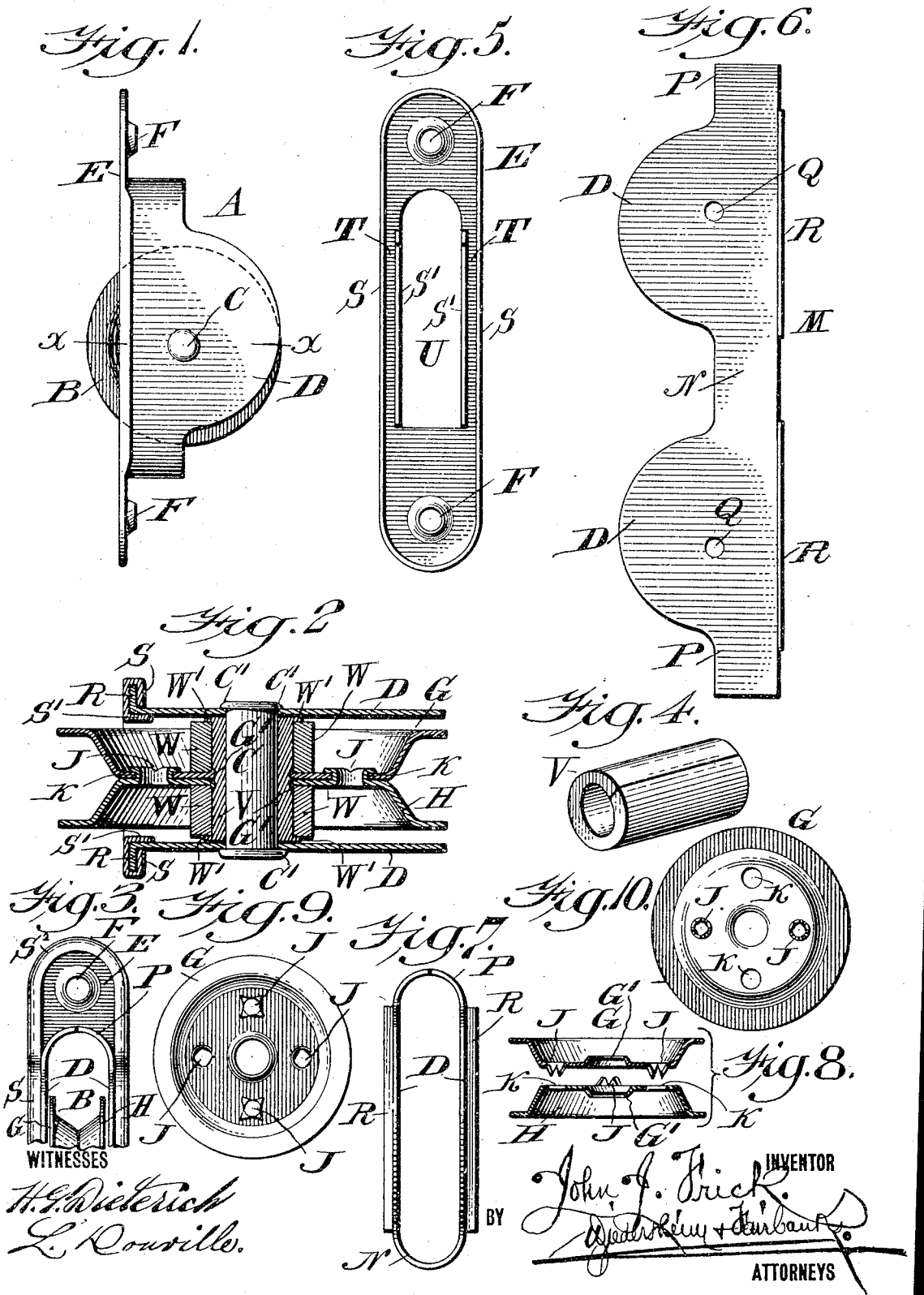

JOHN J. FRICK, OF PHILADELPHIA, PENNSYLVANIA, ASSIGNOR TO THOS. DEVLIN MANUFACTURING CO., OF PHILADELPHIA, PENNSYLVANIA, A CORPORATION OF NEW JERSEY.

PULLEY.

959,212.  Specification of Letters Patent. Patented May 24, 1910.

Application filed September 24, 1909. Serial No. 519,333.

*To all whom it may concern:*

Be it known that I, JOHN J. FRICK, a citizen of the United States, residing in the city and county of Philadelphia, State of Pennsylvania, have invented a new and useful Pulley, of which the following is a specification.

My invention relates to improvements in a sash or other pulley embodying a pulley proper, ears therefor, a face piece, and bearings for the pulley proper on the ears, said pulley proper being formed in sections with means for connecting them as one, said ears being of integral construction, with novel means on the same and the face plate for firmly connecting the ears and face plate as one, and said bearings firmly sustaining the pulley proper and permitting the free rotation thereof, all as will be hereinafter set forth.

For the purpose of explaining the invention, the accompanying drawing illustrates a satisfactory reduction of the same to practice, but the important instrumentalities thereof may be varied, and so it is to be understood that the invention is not limited to the specific arrangement and organization shown and described.

Figure 1 represents a side elevation of a pulley embodying my invention. Fig. 2 represents a section thereof on line $x$—$x$, Fig. 1, on an enlarged scale. Fig. 3 represents a rear view of a portion thereof. Fig. 4 represents a perspective view of the bushing employed. Figs. 5, 6, 7, 8, 9 and 10 represent detached views of different parts illustrating the manner of constructing the same.

Similar letters of reference indicate corresponding parts in the figures.

Referring to the drawings:—A designates the pulley which is constructed of the pulley proper B, the axle or pintle C thereof, the ears D on which said axle is mounted, and the face plate E which is connected with said ears and provided with openings F for the reception of screws by which said plate and consequently the device is secured in position.

The pulley proper B is formed of two matched concave sections G, H, which have on their sides respectively the eyelets J and openings K, see Figs. 8, 9 and 10, the eyelets on one section being passed through the openings of the other section and clenched on the side of the latter section, thus firmly connecting the sections as one, as most clearly shown in Fig. 2, and forming the pulley proper with a central opening for the axle C and a circumferential groove for the sash cord, the walls of said opening having outturned rims G' on its edges. As seen clearly in Figs. 8, 9, and 10, the eyelets J are alternately disposed in opposite directions, so that when the sections are clamped together, by means of said eyelets passing through the openings K and being clenched, the parts are better held against torsional strain and less likely to be separated.

The ears D are formed of a properly shaped plate M, with the neck N between the same and lips P on the end, see Fig. 6. The plate is bent on the neck N and the lips are brought together, thus producing the structure shown in Fig. 7, the ears thus being opposite to each other and having openings Q therein to receive the ends of the axle C, which ends are headed as at C' on said ears, and so firmly connected therewith, while also preventing the ears from spreading. The plate M, Fig. 6, is provided also with flanges R, which in Fig. 7 occupy positions on the sides of the ears.

On the back of the face plate E are flanges S, S', which form the channels T, said flanges being respectively on the sides of said plate, and of the walls of the opening U through which the pulley proper protrudes, see Fig. 5. The flanges R of the ears are inserted in the channels T and the flanges S are bent down and clenched on said flanges R, see Fig. 2, thus firmly connecting the ears and face plate as one. The top and bottom portions $S^2$ of the flanges S are bent down flat on the back of the face plate, as most clearly shown in Fig. 3.

The axle C is surrounded by the bushing V, which occupies the central opening of the pulley proper and constitutes the hub of the pulley, and the ends of said bushing are embraced by the sleeves W, it being noticed that the ends of said bushing are headed as at W' on the outer ends of said sleeves, thus retaining the latter consequently in position. Then as the axle C is passed freely through said bushing and headed on the ears as at C', as has been stated, the pulley proper has reliable bearings on the ears, while the axle is most firmly connected with the latter.

Attention is directed to the fact that the eyelets J are integral with the sections of the pulley proper, thus avoiding separate fastenings or means for connecting said sections, and that the pulley proper, the ears, and the face plate are each formed of sheet metal struck-up or otherwise converted into the required shape with their instrumentalities as named, thus producing a pulley of light, inexpensive, strong and durable members, as hereinbefore enumerated. Attention is also directed to the fact that the sections of the pulley proper are formed preferably of steel or other hard metal, and the bushing V is formed of a metal softer than said sections, whereby in assembling the members of the device, the rims G' of said sections are pressed into the contiguous wall of the bushing, so as to be interlocked therewith and firmly connect the pulley proper with said bushing.

Having thus described my invention, what I claim as new and desire to secure by Letters Patent, is:—

1. In a pulley, sections having interengaging connecting means, an axial bushing forming the hub of the pulley, sleeves surrounding said bushing, said sections having a central opening, the edges of the walls of which are turned laterally and seated in an annular depression in the bushing.

2. In a pulley, sections having interengaging connecting means, an axial bushing forming the hub of the pulley, and sleeves surrounding said bushing, said sections having a central opening, the edges of the walls of which are turned laterally and seated in an annular depression in the bushing, the ends of said hub being headed on the outer ends of said sleeves.

3. In a pulley, sections having interengaging means, a hub, sleeves surrounding said hub, said hub having its ends formed with heads which embrace the ends of said sleeves, an axle in said hub, supporting means for said axle, the inner ends of said sections being passed through said sleeves and provided with rims which are interlocked with said hub.

JOHN J. FRICK.

Witnesses:
A. E. LAUGWASSER,
JAMES H. JONES.